United States Patent [19]

Rauch

[11] Patent Number: 5,566,024
[45] Date of Patent: Oct. 15, 1996

[54] BEAM SEPARATION CONTROL AND BEAM SPLITTING BY SINGLE BLAZED BINARY DIFFRACTION OPTICAL ELEMENT

[75] Inventor: Russell B. Rauch, Pasadena, Calif.

[73] Assignee: Xerox Corporation, Stamford, Conn.

[21] Appl. No.: 172,356

[22] Filed: Dec. 23, 1993

[51] Int. Cl.⁶ ............................................. G02B 5/18
[52] U.S. Cl. ........................ 359/571; 359/566; 359/569
[58] Field of Search .......................... 359/566, 569, 359/571, 558, 565, 621, 622, 639, 640

[56] References Cited

U.S. PATENT DOCUMENTS

| | | | |
|---|---|---|---|
| 4,195,909 | 4/1980 | Holle et al. | 359/566 |
| 4,552,435 | 11/1985 | von Bieren | 359/571 |
| 4,895,790 | 1/1990 | Swanson et al. | 430/321 |
| 4,966,446 | 10/1990 | Huang et al. | 359/851 |
| 5,048,925 | 9/1991 | Gerritsen et al. | 359/569 |
| 5,058,981 | 10/1991 | Umegaki et al. | 359/565 |
| 5,073,007 | 12/1991 | Kedmi et al. | 359/569 |
| 5,122,660 | 6/1992 | Yoshii et al. | 250/237 G |
| 5,162,943 | 11/1992 | Komatsu et al. | 359/569 |
| 5,227,915 | 7/1993 | Grossinger et al. | 359/565 |
| 5,362,957 | 11/1994 | Nakai et al. | 359/569 |
| 5,430,561 | 7/1995 | Kato et al. | 359/566 |
| 5,477,383 | 12/1995 | Jain | 359/565 |
| 5,483,377 | 1/1996 | Kaneda et al. | 359/571 |

OTHER PUBLICATIONS

A. Kathman & E. Johnson, "Binary Optics: New Diffractive Elements for the Designer's Tool Kit", *Photonics Spectra*, Sep. 1992, pp. 125–129.

W. Veldkamp & T. McHugh, "Binary Optics", *Scientific American*, vol. 266, No. 5, May 1992, pp. 92–97.

G. J. Swanson, "Binary Optics Technology: The Theory and Design of Multi–Level Diffractive Optical Elements", Lincoln Laboratory, Massachusetts Institute of Technology, *Technical Report 854*, 14 Aug. 1989.

*Primary Examiner*—Paul M. Dzierzynski
*Assistant Examiner*—John Juba, Jr.
*Attorney, Agent, or Firm*—William Propp

[57] ABSTRACT

Two sets of two single blazed binary diffractive optical elements form a beam separation control apparatus for expanding two closely spaced parallel beams into two wider spaced parallel beams or for contracting two wider spaced parallel beams into two closely spaced parallel beams. Four sets of two single blazed binary diffractive optical elements form a beam separation control apparatus for separating two closely spaced parallel beams into two wider spaced parallel beams for possible modulation or other optical effect, then returning the two beams to be closely spaced and parallel. A set of two adjacent and opposite single blazed binary diffractive optical elements can form a beam splitting apparatus or a beam combining apparatus.

60 Claims, 4 Drawing Sheets

BEAM SEPARATION CONTROL AND BEAM SPLITTING BY SINGLE BLAZED BINARY DIFFRACTION OPTICAL ELEMENT

BACKGROUND OF THE INVENTION

This invention relates to a binary diffractive optical element, and, more particularly, to a single blazed binary diffractive optical element which controls separation of two closely spaced beams and which functions as a beam splitter.

The propagation of a light beam can be changed by three basic means: reflection by a mirror, refraction by a lens and diffraction by a grating. Optical systems traditionally rely on reflection and refraction to achieve the desired optical transformation. Optical design, based on mirror and lens elements, is a well-established and refined process. Until recently, the problems with diffraction and fabricating high efficiency diffractive elements have made diffractive elements unfeasible components of optical systems.

The diffractive process does not simply redirect a light beam. Diffraction, unlike refraction and reflection, splits a light beam into many beams—each of which is redirected at a different angle or order. The percentage of the incident light redirected by the desired angle into some given diffraction order is referred to as the diffraction efficiency for that order. The diffraction efficiency of a diffractive element is determined by the element's surface profile. If the light that is not redirected by the desired angle is substantial, the result will be an intolerable amount of scatter in the image or output plane of the optical system.

Theoretically, on-axis diffractive phase elements consisting of a grating having a given period can achieve 100 percent diffraction efficiency. To achieve this efficiency, however, a continuous phase profile within any given period is necessary. The theoretical diffraction efficiency of this surface profile is also relatively sensitive to a change in wavelength. By contrast, refractive elements are relatively wavelength insensitive. The technology for producing high quality, high efficiency, continuous phase profiles of the diffraction does not presently exist.

A compromise that results in a relatively high diffraction efficiency and ease of fabrication is a multi-level phase grating. The larger the number of discrete phase levels, the better the approximation of the continuous phase function. The multi-level phase surface profiles of the grating can be fabricated using standard semiconductor integrated circuit fabrication techniques.

As disclosed in *Binary Optics Technology: The Theory and Design of Multi-level Diffractive Optical Elements* by G. J. Swanson of the Lincoln Laboratory at the Massachusetts Institute of Technology, (Technical Report 854, 14 Aug. 1989), herewithin incorporated by reference, and the resulting U.S. Pat. No. 4,895,790, a fabrication process starts with a mathematical phase description of a diffractive phase profile and results in a fabricated multi-level diffractive surface. The first step is to take the mathematical phase expression and generate from it a set of masks that contain the phase profile information. The second step is to transfer the phase profile information from the masks into the surface of the element specified by the lens design.

The first step involved in fabricating the multi-level element is to mathematically describe the ideal diffractive phase profile that is to be approximated in a multi-level fashion. The next step in the fabrication process is to create a set of lithographic masks which are produced by standard pattern generators used in the integrated circuit industry.

A substrate of the desired material, such as glass, Ge, ZnSe, Si, GaAs, and $SiO_2$, is coated with a thin layer of photoresist. A first lithographic mask is then placed in intimate contact with the substrate and illuminated from above with an ultraviolet exposure lamp. Alternately, pattern generators, either optical or electron beam, can expose the thin layer of photoresist. The photoresist is developed, washing away the exposed resist and leaving the binary grating pattern in the remaining photoresist. This photoresist will act as an etch stop.

The most reliable and accurate way to etch many optical materials is to use reactive ion etching. The process of reactive ion etching anisotropically etches material at very repeatable rates. The desired etch depth can be obtained very accurately. The anisotropic nature of the process assures a vertical etch, resulting in a true binary surface relief profile. Once the substrate has been reactively ion etched to the desired depth, the remaining photoresist is stripped away, leaving a binary surface relief phase grating.

The process may be repeated using a lithographic mask having half the period of the first mask. The binary phase element is recoated with photoresist and exposed using the second lithographic mask which has half the period of the first mask. After developing and washing away the exposed photoresist, the substrate is reactively ion etched to a depth half that of the first etch. Removal of the remaining photoresist results in a 4 level approximation to the desired profile. The process may be repeated a third and fourth time with lithographic masks having periods of one-quarter and one-eighth that of the first mask, and etching the substrates to depths of one-quarter and one-eighth that of the first etch. The successive etches result in elements having 8 and 16 phase levels. More masks than four might be used, however, fabrication errors tend to predominate as more masks are used.

This process produces a multilevel surface relief grating structure in the substrate. The result is a discrete, computer-generated structure approximating the original idealized diffractive surface. For each additional mask used in the fabrication process, the number of discrete phase levels is doubled, hence the name "binary" optical element or, more precisely, a binary diffractive optical element.

After only four processing iterations, a 16 phase level approximation to the continuous case can be obtained. The process can be carried out in parallel, producing many elements simultaneously, in a cost-effective manner.

A 16 phase level structure achieves 99 percent diffraction efficiency. The residual 1 percent of the light is diffracted into higher orders and manifests itself as scatter. In many optical systems, this is a tolerable amount of scatter. The fabrication of the 16 phase level structure is relatively efficient due to the fact that only four processing iterations are required to produce the element.

After the first etching step, the second and subsequent lithographic masks have to be accurately aligned to the existing pattern on the substrate. Alignment is accomplished using another tool standard to the integrated circuit industry, a mask aligner.

As noted, the photoresist on the substrate can be exposed with an electron-beam pattern generator. The e-beam direct-write process eliminates masks and their corresponding alignment and exposure problems. Binary optics have also been reproduced using epoxy casting, solgel casting, embossing, injection molding and holographic reproduction.

Binary optical elements have a number of advantages over conventional optics. Because they are computer-generated, these elements can perform more generalized wavefront shaping than conventional lenses or mirrors. Elements need only be mathematically defined: no reference surface is necessary. Therefore, wildly asymmetric binary optics are able to correct aberrations in complex optical systems, and elements can be made wavelength-sensitive for special laser systems.

The diffractive optical elements are generally thinner, lighter and can correct for many types of aberrations and distortions. It is possible to approximate a continuous phase profile with a stepwise profile of discrete phase levels.

Separating closely spaced beams allows the beams to be separately modulated or otherwise optically changed and helps prevent cross-talk between the closely spaced beams.

Current technology can use single crystals, particularly calcite crystals, as beam separation control. However, these crystals cannot be artificially grown, which limits their availability and ability to be mass reproduced. The crystals require extensive fabrication and precision assembly.

Alternate methods of glass plates and miniature prisms are expensive and difficult to manufacture. Mechanical adjustment is required to set the center to center spacing of the adjacent beams.

The advantages of a beam separation control by a binary diffractive optical element are the low cost and compact substrate of a binary diffractive optical element. The binary diffractive optical element can be fabricated using photolithography techniques. The binary diffractive optical element can be batch processed and coated with any necessary anti-reflective coatings upon a single substrate and subsequently diced into individual elements. The beam separation control of a binary diffractive optical element only depend upon the grating period and the wavelength of light.

It is an object of this invention to provide beam separation control by a binary diffractive optical element.

SUMMARY OF THE INVENTION

In accordance with the present invention, two sets of two single blazed binary diffractive optical elements form a beam separation control apparatus for expanding two closely spaced parallel beams into two wider spaced parallel beams or for contracting two wider spaced parallel beams into two closely spaced parallel beams. Four sets of two single blazed binary diffractive optical elements form a beam separation control apparatus for separating two closely spaced parallel beams into two wider spaced parallel beams for possible modulation or other optical effect, then returning the two beams to be closely spaced and parallel. A set of two adjacent and opposite single blazed binary diffractive optical elements can form a beam splitting apparatus or a beam combining apparatus.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
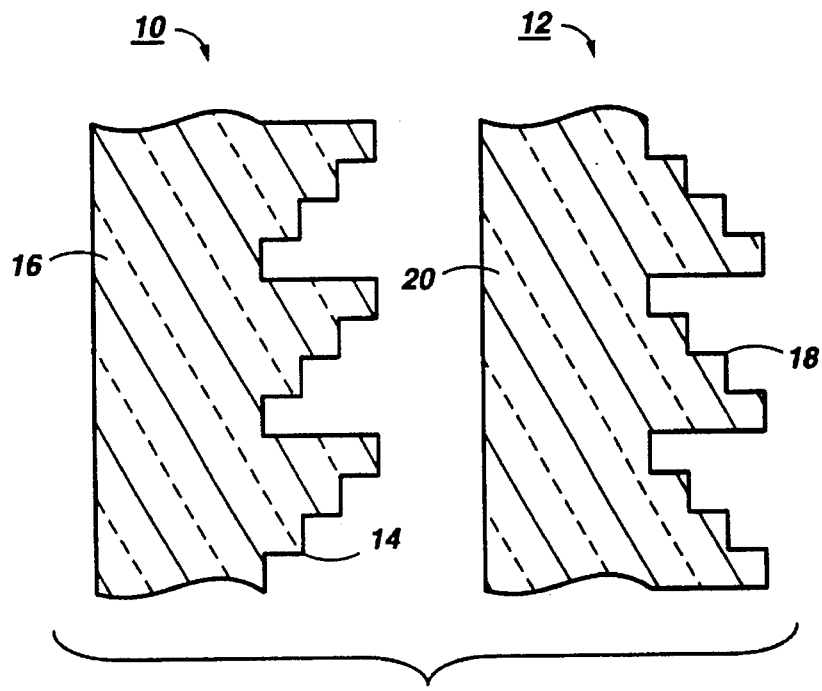
FIG. 1 is a schematic illustration of the cross-section side view of two single blazed binary diffractive optical elements formed according to the present invention.

Reference is now made to FIG. 1, wherein there is illustrated a first set of single blazed binary diffractive optical elements 10 and 12. The binary diffractive optical element 10, that of a single blazed grating, has a surface relief phase grating structure 14 on a substrate 16. The binary diffractive optical element 12, also that of a single blazed grating, has a surface relief phase grating structure 18 on a substrate 20. In this illustrative example, the surface relief phase grating structures 14 and 18 are each a sixteen level surface relief phase grating structure so that the diffraction efficiency of the binary diffractive optical element is approximately 99 percent.

The individual blazed grating grooves 14 are the opposite of the individual blazed grating grooves 18. The blazed grating grooves have the same grating period P and a depth D. Accordingly, blazed grating grooves 14 and 18 will diffract an incident light beam equally and oppositely away from the optical axis.

A single blazed diffractive optical element will diffract incident light into a single order, according to the wavelength and grating depth. The other diffraction orders and the undiffracted zero order transmitted beam will be suppressed so that the diffracted light is all in a single order. When the grating blaze is approximated by a series of binary steps, the performance of the resulting binary diffractive optical element approximates that of the diffractive element according to well-known relationships.

The optimum maximum depth, $d_0$, for the deepest phase level or groove in the binary diffractive optical element will be $$d_0 = \lambda/(n-1) \qquad \text{Equation 1}$$

where $\lambda$ is the wavelength of the incident light beam and $n$ is the index of refraction of the optical substrate 16 or 20.

When the groove depth is at the optimum maximum depth, $d_0$, of Equation 1, then the diffractive efficiency is 100 percent. All of an incident beam will be diffracted into the first order beam by the binary diffractive optical element. None of the incident light beam would be transmitted through the binary diffractive optical element as an undiffracted, zero order beam. The binary diffractive optical element is a blazed grating. The depth, D, of the individual gratings 14 and 18 is this optimum maximum depth, $d_0$, so that the individual gratings 14 and 18 are blazed gratings.

Figure 2:
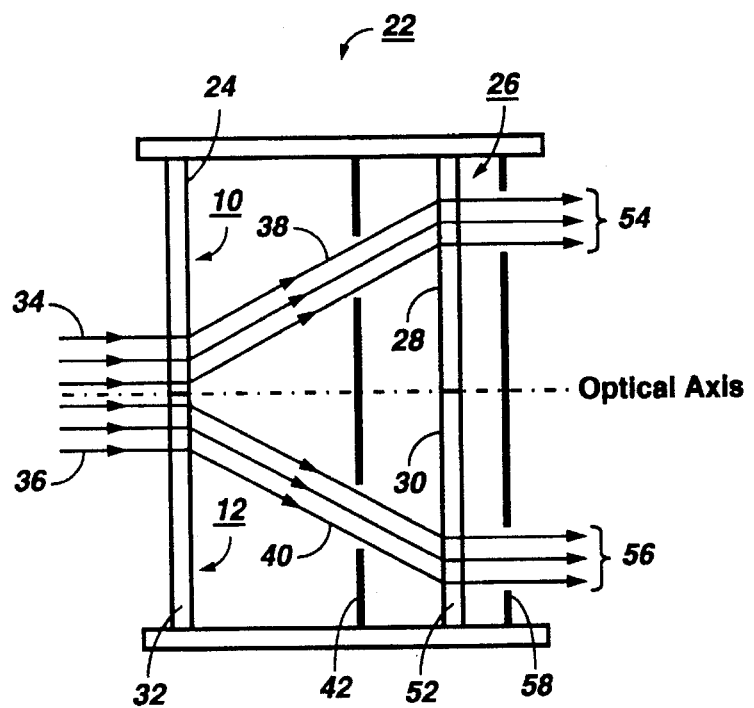
FIG. 2 is a schematic illustration of the cross-section side view of a single blazed binary diffractive optical element beam separation control apparatus for expanding the spacing distance between two closely spaced beams according to the present invention.

As shown in FIG. 2, the beam separation control apparatus 22 will consist of a first set 24 of single blazed binary diffractive optical elements 10 and 12 and a second set 26 of single blazed binary diffractive optical elements 28 and 30. The first set 24 of two single blazed binary diffractive optical elements 10 and 12 are typically on a common substrate 32. The two single blazed binary diffractive optical elements are equally spaced but on opposite sides of the optical axis.

A laser source (not shown) will emit a first beam 34 of a single wavelength which has been collimated by a collimator (also not shown). Another laser source or the same laser source (not shown) will emit a second beam 36 of the same wavelength and the same intensity as the first beam 34. The second beam is also collimated by a collimator (also not shown). The beams can be modulated by means not shown and need not be of equal intensity.

The first collimated beam 34 and the second collimated beam 36 are parallel and on opposite sides of the optical axis. Each beam is a distance, x, from the optical axis so that the centerline of the first collimated beam 34 and the centerline of the second collimated beam 36 are separated by a distance, 2x.

The first collimated beam 34 and the second collimated beam 36 are then incident upon the first set 24 of single blazed binary diffractive optical elements 10 and 12.

The first collimated beam 34 is incident upon the first single blazed binary diffractive optical element 10. The blazed grating grooves 14 of the single blazed binary diffractive optical element 10 will diffract the incident beam 34 into a first order diffracted beam 38.

The second collimated beam 36 is incident upon the second single blazed binary diffractive optical element 12. The blazed grating grooves 18 of the single blazed binary diffractive optical element 12 will diffract the incident beam 36 into a first order diffracted beam 40.

Since the depth of the blazed gratings was determined by the wavelength of the incident light beam and the index of refraction of the substrate, nearly all of the intensity of the incident light beam will be diffracted into the first order diffracted beam.

The first order diffracted light beams 38 and 40 propagate at equal but opposite angles away from the optical axis of the incident beam. A stop 42 can block any stray light beams other than the primary light beams 38 and 40.

The angle $\theta$ by which the light beams 38 and 40 are diffracted is dependent upon the wavelength $\lambda$ and the grating period P where $$\sin \theta = \lambda / P \qquad \text{Equation 2}$$

where $\lambda$ is the wavelength of the incident light beam 34 and 36 and P is the grating period of the individual grating grooves of the surface relief phase grating structure 14 and 18.

Figure 3:
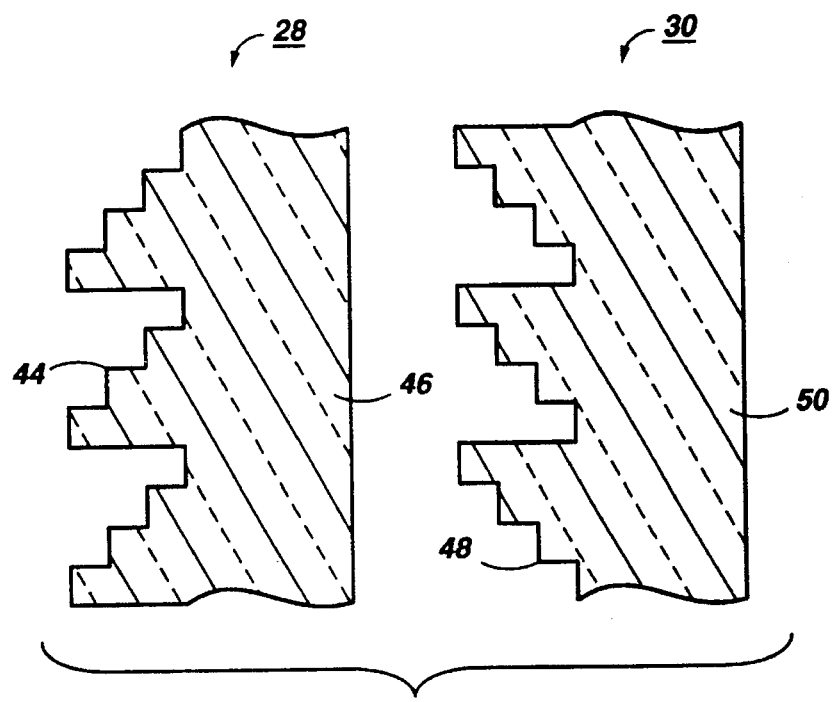
FIG. 3 is a schematic illustration of the cross-section side view of two single blazed binary diffractive optical elements of FIG. 2 formed according to the present invention.

The single blazed binary diffractive optical element 28 as shown in FIG. 3 has a surface relief phase grating structure 44 on a substrate 46. The surface relief phase grating structure 44 of the single blazed binary diffractive optical element 28 has the same grating period P and a depth D as the surface relief phase grating structure 14 of the binary diffractive optical element 10. The single blazed binary diffractive optical element 28 has inverse blazing with respect to the single blazed binary diffractive optical element 10. The surface relief phase grating structure 14 of the binary diffractive optical element 10 is on the output side of the binary diffractive optical element. Incident light passes through the substrate 16 before being diffracted by the relief phase grating structure 14 on the surface. The surface relief phase grating structure 44 of the binary diffractive optical element 28 is on the incident side of the binary diffractive optical element. Incident light is diffracted by the relief phase grating structure 44 on the surface before passing through the substrate 46.

Similarly, the single blazed binary diffractive optical element 30 has a surface relief phase grating structure 48 on a substrate 50. The surface relief phase grating structure 48 of the single blazed binary diffractive optical element 30 has the same grating period P and a depth D as the surface relief phase grating structure 18 of the binary diffractive optical element 12. The single blazed binary diffractive optical element 30 has inverse blazing with respect to the single blazed binary diffractive optical element 12. The surface relief phase grating structure 18 of the binary diffractive optical element 12 is on the output side of the binary diffractive optical element. Incident light passes through the substrate 20 before being diffracted by the relief phase grating structure 18 on the surface. The surface relief phase grating structure 48 of the binary diffractive optical element 30 is on the incident side of the binary diffractive optical element. Incident light is diffracted by the relief phase grating structure 48 on the surface before passing through the substrate 50.

Accordingly, the individual blazed grating grooves 44 are the opposite of the individual blazed grating grooves 48. The blazed grating grooves have the same grating period P and a depth D. The blazed grating grooves 44 and 48 will diffract an incident light beam equally and oppositely toward the optical axis.

Returning to FIG. 2, the second set 26 of two single blazed binary diffractive optical elements 28 and 30 are typically on a common substrate 52. The two single blazed binary diffractive optical elements are equally spaced but on opposite sides of the optical axis.

The diffracted light beam 38 from single blazed binary diffractive optical element 10 will be diffracted by single blazed binary diffractive optical element 28 into first order diffracted beam 54. The diffracted light beam 40 from single blazed binary diffractive optical element 12 will be diffracted by single blazed binary diffractive optical element 30 into first order diffracted beam 56.

The diffracted light beams 54 and 56 are parallel to each other and to the incident light beams 34 and 36. A stop 58 can block any stray light other than the first order diffracted light beams 54 and 56. The two diffracted light beams 54 and 56 also remain collimated since the grating period of the various binary optical elements in their light path is constant. From Equation 2, there is no angular deviation if the wavelength of the light beam and the period of the gratings remain constant.

The first beam 54 and the second beam 56 are parallel and on opposite sides of the optical axis. Each beam is a distance, y, from the optical axis so that the first beam 54 and the second beam 56 are separated by a distance, 2y. In this embodiment, the distance 2y separating the two parallel beams 54 and 56 is greater than the distance 2x separating the two initial incident parallel beams 34 and 36.

The diffraction angle θ can be varied by altering the wavelength λ of the beams or by changing the grating period P of the single blazed binary diffractive optical elements. The distance d between the two sets of single blazed binary diffractive optical elements can also be changed. Thus, the beam separation control apparatus 22 of FIG. 2 can easily adjust and expand the spacing distance between two beams.

Figure 4:
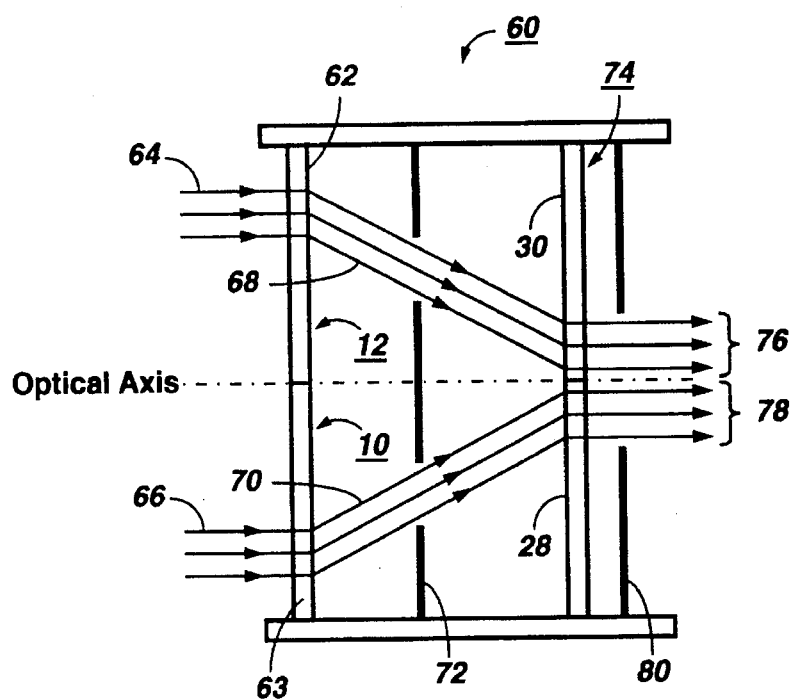
FIG. 4 is a schematic illustration of the cross-section side view of a single blazed binary diffractive optical element beam separation control apparatus for contracting the spacing distance between two widely spaced beams according to the present invention.

The two sets of single blazed binary diffractive optical elements can also form a beam separation control apparatus 60 of FIG. 4 for spacing and contracting the distance between two beams. The beam separation control apparatus 60 of FIG. 4 is merely the reverse of beam separation control apparatus 22 of FIG. 2.

Thus, the first set 62 of two single blazed binary diffractive optical elements 10 and 12 are on a common substrate 63. The two single blazed binary diffractive optical elements 10 and 12 in the beam separation control apparatus 60 of FIG. 4 for contracting the distance between two beams are on the opposite side of the optical axis from their positions in the beam separation control apparatus 22 of FIG. 2 for expanding the distance between two beams.

Two parallel collimated beams 64 and 66 (from a laser source and collimator not shown) are equally spaced a distance y from the optical axis and a distance 2y from each other. The two beams 64 and 66 have the same wavelength. The two beams 64 and 66 are incident upon the first set 62 of two single blazed binary diffractive optical elements 28 and 30.

Collimated light beam 64 is incident upon the single blazed binary diffractive optical element 12 and will be diffracted into first order diffracted beam 68. Collimated light beam 66 is incident upon the single blazed binary diffractive optical element 10 and will be diffracted into first order diffracted beam 70.

Diffracted beams 68 and 70 propagate at equal angles toward the optical axis but also at opposite angles from the optical axis. A stop 72 can block any stray light other than the diffracted light beams 68 and 70.

The angle θ by which the light beams 68 and 70 are diffracted is dependent upon the wavelength of the incident light beams 64 and 66 and the grating pitch, P, of the individual grating grooves of the two single blazed binary diffractive optical elements 30 and 28 as set forth in Equation 2.

The second set 74 of two single blazed binary diffractive optical elements 28 and 30 are on a common substrate 74. The two single blazed binary diffractive optical elements 28 and 30 in the beam separation control apparatus 60 of FIG. 4 for contracting the distance between two beams are on the opposite side of the optical axis from their positions in the beam separation control apparatus 22 of FIG. 2 for expanding the distance between two beams.

The two diffracted beams 68 and 70 are incident upon the second set 74 of two single blazed binary diffractive optical elements 10 and 12.

Diffracted light beam 68 from the single blazed binary diffractive optical element 12 is incident upon the single blazed binary diffractive optical element 30 and will be diffracted into first order diffracted beam 76. Diffracted light beam 70 from the single blazed binary diffractive optical element 10 is incident upon the single blazed binary diffractive optical element 28 and will be diffracted into first order diffracted beam 78. A stop 80 can block any stray light other than the diffracted light beams 76 and 78.

The first diffracted beam 76 and the second diffracted beam 78 are parallel and on opposite sides of the optical axis. Each beam is a distance, y, from the optical axis so that the first beam 76 and the second beam 78 are separated by a distance, 2y. In this embodiment, the distance 2x separating the two parallel beams 76 and 78 is less than the distance 2y separating the two initial incident parallel beams 64 and 66.

The diffraction angle θ can be varied by altering the wavelength λ of the beams or by changing the grating period P of the single blazed binary diffractive optical elements. The distance d between the two sets of single blazed binary diffractive optical elements can also be changed. Thus, the beam separation control apparatus 60 of FIG. 4 can easily adjust and contract the spacing distance between two beams.

In the beam separation control apparatus 60 of FIG. 4, the surface relief phase grating structure 14 of the binary diffractive optical element 10 and the surface relief phase grating structure 18 of the binary diffractive optical element 12 are on the output side of the binary diffractive optical element. Incident light passes through the substrate before being diffracted by the relief phase grating structure on the surface. The surface relief phase grating structure 48 of the binary diffractive optical element 30 and the surface relief phase grating structure 44 of the binary diffractive optical element 28 are on the incident side of the binary diffractive optical element. Incident light is diffracted by the relief phase grating structure on the surface before passing through the substrate.

Figure 5:
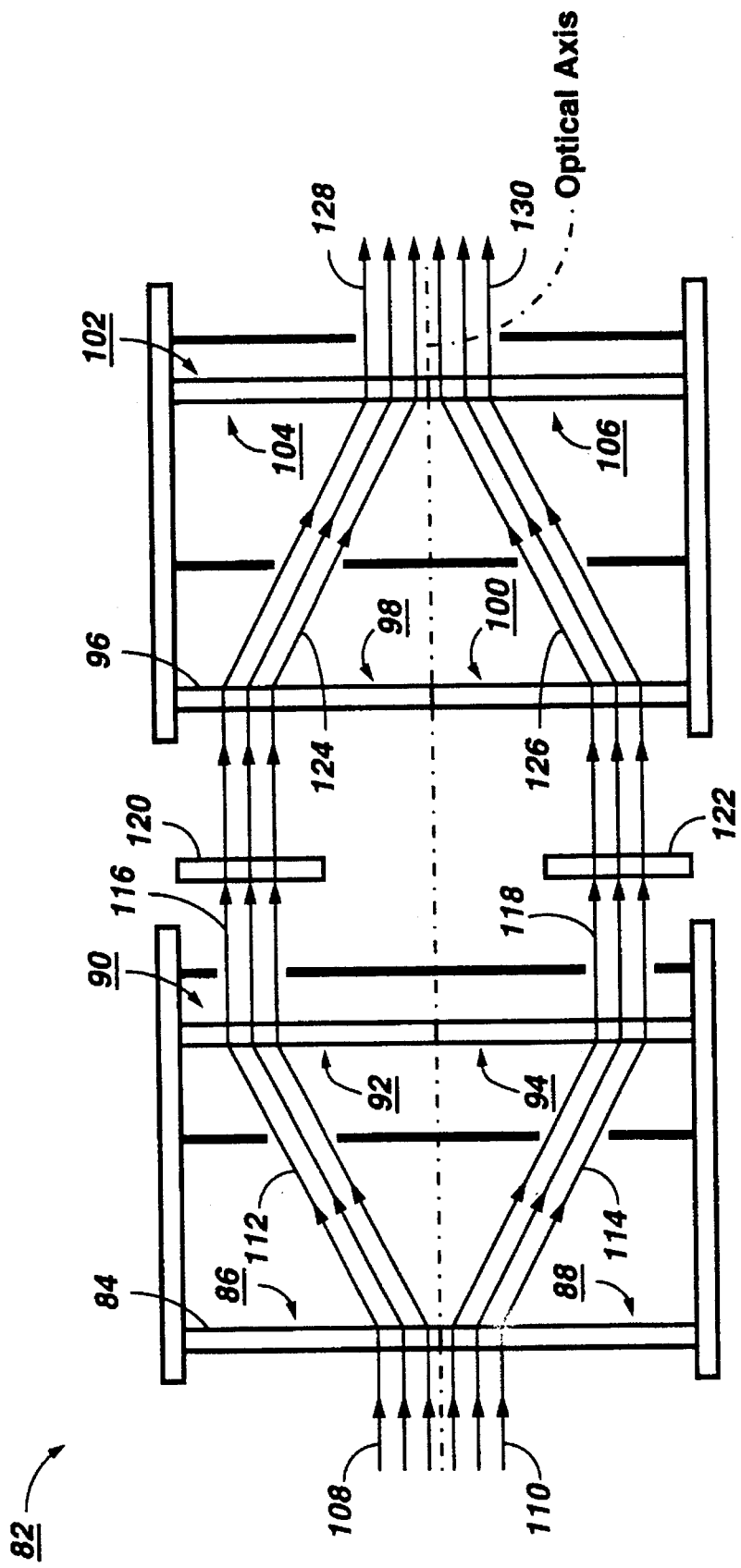
FIG. 5 is a schematic illustration of the cross-section side view of a single blazed binary diffractive optical element beam separation control apparatus for expanding the spacing distance between two closely spaced beams and contracting the spacing distance between the resulting two widely spaced beams according to the present invention.

The beam separation control apparatus 22 of FIG. 2 and the beam separation control apparatus 60 of FIG. 4 can be integrated to form the beam separation control apparatus 82 of FIG. 5 for separating two closely spaced incident beams into two wider spaced beams, then returning the two beams to be closely spaced.

The beam separation control apparatus 82 of FIG. 5 will consist of a first set 84 of two single blazed binary diffractive optical elements 86 and 88 for diverging two closely spaced beams, a second set 90 of two single blazed binary diffractive optical elements 92 and 94 for making the two now wider spaced beams parallel, a third set 96 of two single blazed binary diffractive optical elements 98 and 100 for converging the two wider spaced beams and a fourth set 102 of two single blazed binary diffractive optical elements 104 and 106 for making the two now closely spaced beams parallel. Each set of two single blazed binary diffractive optical elements can be on a common substrate. Stops can block any stray light other than the primary beams.

Thus, a laser source (not shown) will emit a first beam 108 of a single wavelength which has been collimated by a collimator (also not shown). Another laser source or the same laser source (not shown) will emit a second beam 110 of the same wavelength and the same intensity as the first beam 108. The second beam is also collimated by a collimator (also not shown).

The first collimated beam 108 and the second collimated beam 110 are parallel and on opposite sides of the optical axis. Each beam is a distance, x, from the optical axis so that the first collimated beam 108 and the second collimated beam 110 are separated by a distance, 2x.

The first collimated beam 108 and the second collimated beam 110 are then incident upon the first set 84 of single blazed binary diffractive optical elements 86 and 88.

The first collimated beam 108 will be diffracted by the single blazed binary diffractive optical element 86 into a first order diffracted beam 112. The second collimated beam 110 will be diffracted by the single blazed binary diffractive optical element 88 into a first order diffracted beam 114.

The diffracted light beams 112 and 114 propagate at equal but opposite angles away from the optical axis of the incident beams.

The diffracted beams 112 and 114 are then incident upon the second set 90 of two single blazed binary diffractive optical elements 92 and 94.

The diffracted light beam 112 from single blazed binary diffractive optical element 86 will be diffracted by single blazed binary diffractive optical element 92 into first order diffracted beam 116. The diffracted light beam 114 from single blazed binary diffractive optical element 88 will be diffracted by single blazed binary diffractive optical element 94 into first order diffracted beam 118.

The diffracted light beams 116 and 118 are parallel to each other and to the incident light beams 108 and 110.

The first beam 116 and the second beam 118 are parallel and on opposite sides of the optical axis. Each beam is a distance, y, from the optical axis so that the first beam 116 and the second beam 118 are separated by a distance, 2y. In this embodiment, the distance 2y separating the two parallel beams 116 and 118 is greater than the distance 2x separating the two initial incident parallel beams 108 and 110.

The light beam 116 can then pass through an optical modulation means 120, such as a modulator or other device for effecting the phase, amplitude, polarization or other optical properties of the light beam. The light beam 118 can then pass through an optical modulation means 122, such as a modulator or other device for effecting the phase, amplitude, polarization or other optical properties of the light beam. Neither, either or both beams 116 and 118 can be optically modulated.

The diffracted beams 116 and 118 are then incident upon the third set 96 of two single blazed binary diffractive optical elements 98 and 100. Diffracted light beam 116 is incident upon the single blazed binary diffractive optical element 98 and will be diffracted into first order diffracted beam 124. Diffracted light beam 118 is incident upon the single blazed binary diffractive optical element 100 and will be diffracted into first order diffracted beam 126.

Diffracted beams 124 and 126 propagate at equal angles toward the optical axis but also at opposite angles from the optical axis.

The diffracted beams 124 and 126 are then incident upon the fourth set 102 of two single blazed binary diffractive optical elements 104 and 106.

Diffracted light beam 124 from the single blazed binary diffractive optical element 98 is incident upon the single blazed binary diffractive optical element 104 and will be diffracted into first order diffracted beam 128. Diffracted light beam 126 from the single blazed binary diffractive optical element 100 is incident upon the single blazed binary diffractive optical element 106 and will be diffracted into first order diffracted beam 130.

The first diffracted beam 128 and the second diffracted beam 130 are parallel and on opposite sides of the optical axis. Each beam is a distance, z, from the optical axis so that the first beam 128 and the second beam 130 are separated by a distance, 2z. In this embodiment, the distance 2z separating the two parallel beams 128 and 130 is less than the distance 2y separating the two parallel beams 116 and 118. The distance 2z may or may not be equal to the distance 2x between the initial incident beams 108 and 110. As previously discussed, each single blazed binary diffractive optical element within a set is opposite from the other.

The first set of two single blazed binary diffractive optical elements has inverse blazing with respect to the second set of two single blazed binary diffractive optical elements. The third set of two single blazed binary diffractive optical elements has inverse blazing with respect to the fourth set of two single blazed binary diffractive optical elements. However, the first and second sets need not have inverse blazing with respect to the third and fourth set.

The z spacing distance would be different from the x spacing distance based upon changes in the diffraction angle, the distance between sets of single blazed diffractive optical elements and the differences between the pitch and depth of the third and fourth set versus the first and second set.

Figure 6:
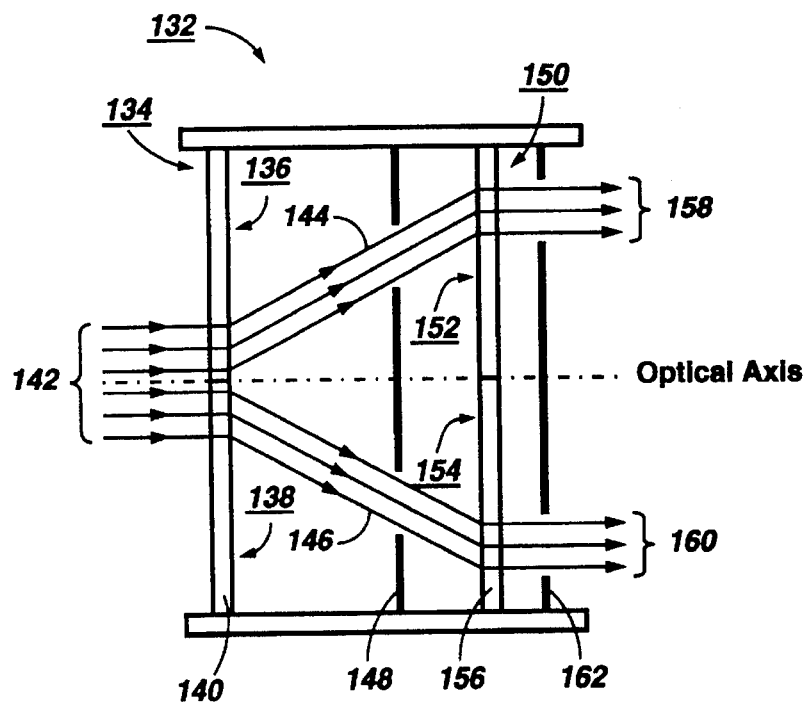
FIG. 6 is a schematic illustration of the cross-section side view of a single blazed binary diffractive optical element beam splitter apparatus for splitting an incident light beam into two separate light beams according to the present invention.

Reference is now made to FIG. 6, wherein there is illustrated a beam splitting apparatus 132 for splitting an incident beam into two first order diffracted beams. The beam splitting apparatus will consist of a set 134 of two single blazed binary diffractive optical elements 136 and 138. The individual blazed grating grooves of the first single blazed binary diffractive optical element 136 are opposite the individual blazed grating grooves of the second single blazed binary diffractive optical element 138 but both have the same grating period P and a depth D. Accordingly, the two single blazed binary diffractive optical elements 136 and 138 will diffract an incident light beam equally and oppositely away from the optical axis. The two single blazed binary diffractive optical elements 136 and 138 are adjacent, typically on a common substrate 140.

A laser source (not shown) will emit a single beam 142 of a single wavelength which has been collimated by a collimator (also not shown). The collimated beam 34 is then incident upon the set 134 of two single blazed binary diffractive optical elements 136 and 138 of the beam splitting apparatus 132.

The portion of the beam 142 incident upon the single blazed binary diffractive optical element 136 will be diffracted into first order diffracted beam 144. The portion of the beam 142 incident upon the single blazed binary diffractive optical element 138 will be diffracted into first order diffracted beam 146. An equal percent of the intensity of the beam 142 can be incident on each of the two single blazed binary diffractive optical elements but the percentage of intensity of the incident beam need not be the same for each single blazed binary diffractive optical element.

The diffracted light beams 144 and 146 propagate at equal but opposite angles away from the optical axis of the incident beam. A stop 148 can block any stray light beams other than the first diffracted beam 144 and the second diffracted beam 146.

The beam splitting apparatus 132 can include a second set 150 of two single blazed binary diffractive optical elements 152 and 154. The two single blazed binary diffractive optical elements are spaced apart but equally spaced on opposite sides of the optical axis. The two single blazed binary diffractive optical elements 152 and 154 are typically on a common substrate 156. As discussed previously, the single blazed binary diffractive optical element 152 will have inverse blazing with respect to the single blazed binary diffractive optical element 136 and the single blazed binary diffractive optical element 154 will have inverse blazing with respect to the single blazed binary diffractive optical element 138.

The diffracted beams 144 and 146 are then incident upon the second set 150 of two single blazed binary diffractive optical elements 152 and 154.

The diffracted light beam 144 from single blazed binary diffractive optical element 136 will be diffracted by single blazed binary diffractive optical element 152 into first order diffracted beam 158. The diffracted light beam 146 from single blazed binary diffractive optical element 138 will be diffracted by single blazed binary diffractive optical element 154 into first order diffracted beam 160.

The diffracted collimated light beams 158 and 160 are parallel to each other and to the incident light beam 142. A stop 162 can block any stray light other than the first order diffracted light beams 158 and 160.

Figure 7:
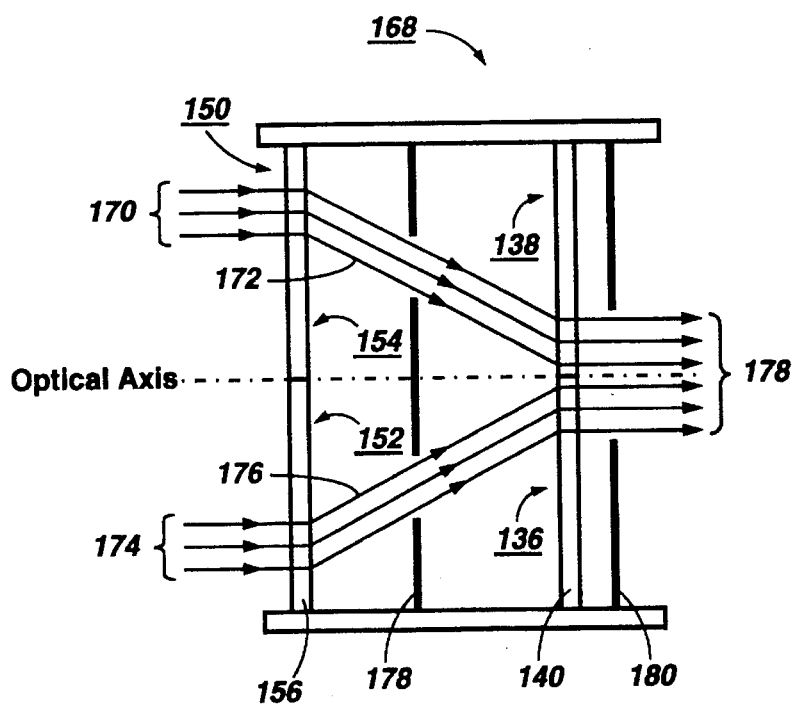
FIG. 7 is a schematic illustration of the cross-section side view of a single blazed binary diffractive optical element beam combiner apparatus for combining two separate incident light beams into a single light beam according to the present invention.

The set 134 of two adjacent, opposite, single blazed binary diffractive optical elements 136 and 138 can form a beam combining apparatus 168 of FIG. 7. The beam combining apparatus 168 of FIG. 7 is merely the reverse of beam splitting apparatus 132 of FIG. 6.

The two single blazed binary diffractive optical elements 136 and 138 are on a common substrate 140. The two single blazed binary diffractive optical elements 136 and 138 in the beam combiner apparatus are on opposite sides of the optical axis from their positions in the beam splitting apparatus.

Similarly, the beam combining apparatus 168 of FIG. 7 can have another set 150 of two single blazed binary diffractive optical elements 152 and 154. The two single blazed binary diffractive optical elements 152 and 154 are typically on a common substrate 156. The two single blazed binary diffractive optical elements 152 and 154 in the beam combiner apparatus are on opposite sides of the optical axis from their positions in the beam splitting apparatus.

Collimated light beam 170 is incident upon the single blazed binary diffractive optical element 154 and will be diffracted into first order diffracted beam 172. Collimated light beam 174 is incident upon the single blazed binary diffractive optical element 152 and will be diffracted into first order diffracted beam 176. Light beams 170 and 174 are parallel and on opposite sides of the optical axis. Light beams 170 and 174 also have the same wavelength.

Diffracted beams 172 and 176 propagate at equal angles toward the optical axis but also at opposite angles from the optical axis. A stop 178 can block any stray light other than the diffracted light beams 172 and 176.

The two diffracted beams 172 and 176 converge and are diffracted by the set 134 of two adjacent, opposite, single blazed binary diffractive optical elements 136 and 138 into a single combined light beam 178.

The diffracted light beam 172 from single blazed binary diffractive optical element 154 will be diffracted by single blazed binary diffractive optical element 138 into a portion of the first order diffracted light beam 178. The diffracted light beam 176 from single blazed binary diffractive optical element 152 will be diffracted by single blazed binary diffractive optical element 136 into a portion of the first order diffracted light beam 178. A stop 72 can block any higher diffraction order beams from the double blazed diffractive optical element 10 or any stray light other than the diffracted combined light beam 180.

The beam splitting apparatus 132 of FIG. 6 and the beam combining apparatus 168 of FIG. 7 can be integrated to form a beam splitting an combining apparatus, like the beam separation control apparatus 82 of FIG. 5, for splitting a single incident beam into two beams, then combining the two beams into a single beam, where the two split, parallel, double diffracted beams between the beam splitting apparatus and the beam combining apparatus can be optically modulated.

The beam splitting apparatus 132 of FIG. 6 can be substituted for the beam separation control apparatus 22 of FIG. 2 within the beam separation control apparatus 82 of FIG. 5 for splitting a single incident beam into two beams, then converging the two beams into two closely spaced beams, where the two split, parallel, double diffracted beams between the beam splitting apparatus and the beam separation control apparatus 82 can be optically modulated.

Similarly, the combining apparatus 168 of FIG. 7 an be substituted for the beam separation control apparatus 82 of FIG. 5 within the beam separation control apparatus 82 of FIG. 5 for separating two closely spaced incident beams, then combining the two beams into a single beam, where the two split, parallel, double diffracted beams between the beam separation control apparatus 22 and the beam combining apparatus can be optically modulated.

The beam splitters need not split the beam into two beams of equal intensity and the beam combiners need not combine two beams of equal intensity. The diffracted beams need not be parallel to each other or to the incident beam or beams.

The initial incident beam or beams can be modulated.

The substrates can be formed from glass, gallium arsenide, zinc selenide, germanium or quartz, for example.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A beam separation control apparatus for separating a first light beam and a second light beam comprising a first single blazed binary diffractive optical element having a multilevel surface relief phase grating structure upon an optical substrate, said multilevel surface relief phase grating structure having individual blazed diffraction gratings for diffracting said first light beam into a first diffracted light beam, a second single blazed binary diffractive optical element having a multilevel surface relief phase grating structure upon an optical substrate, said multilevel surface relief phase grating structure having individual blazed diffraction gratings for diffracting said second light beam into a second diffracted light beam, a third single blazed binary diffractive optical element having a multilevel surface relief phase grating structure upon an optical substrate, said multilevel surface relief phase grating structure having individual blazed diffraction gratings for diffracting said first diffracted light beam from said first single blazed binary diffractive optical element into a first double diffracted light beam, and a fourth single blazed binary diffractive optical element having a multilevel surface relief phase grating structure upon an optical substrate, said multilevel surface relief phase grating structure having individual blazed diffraction gratings for diffracting said second diffracted light beam from said second single blazed binary diffractive optical element into a second double diffracted light beam, wherein said first double diffracted light beam and said second double diffracted light beam are a greater distance apart than said first light beam and said light second beam.

2. The beam separation control apparatus for separating a first light beam and a second light beam of claim 1 wherein said individual blazed diffraction gratings of said first single blazed binary diffractive optical element have opposite blazing with respect to said individual blazed diffraction gratings of said second single blazed binary diffractive optical element.

3. The beam separation control apparatus for separating a first light beam and a second light beam of claim 1 wherein said individual blazed diffraction gratings of said third single blazed binary diffractive optical element have inverse blazing with respect to said individual blazed diffraction gratings of said first single blazed binary diffractive optical element.

4. The beam separation control apparatus for separating a first light beam and a second light beam of claim 1 wherein said individual blazed diffraction gratings of said fourth single blazed binary diffractive optical element have inverse blazing with respect to said individual blazed diffraction gratings of said second single blazed binary diffractive optical element.

5. The beam separation control apparatus for separating a first light beam and a second light beam of claim 1 wherein said first single blazed binary diffractive optical element and said second single blazed binary diffractive optical element have the same substrate.

6. The beam separation control apparatus for separating a first light beam and a second light beam of claim 1 wherein said third single blazed binary diffractive optical element and said fourth single blazed binary diffractive optical element have the same substrate.

7. A beam separation control apparatus for separating a first light beam and a second light beam comprising a first single blazed binary diffractive optical element having a multilevel surface relief phase grating structure upon an optical substrate, said multilevel surface relief phase grating structure having individual blazed diffraction gratings for diffracting said first light beam into a first diffracted light beam, a second single blazed binary diffractive optical element having a multilevel surface relief phase grating structure upon an optical substrate, said multilevel surface relief phase grating structure having individual blazed diffraction gratings for diffracting said second light beam into a second diffracted light beam, a third single blazed binary diffractive optical element having a multilevel surface relief phase grating structure upon an optical substrate, said multilevel surface relief phase grating structure having individual blazed diffraction gratings for diffracting said first diffracted light beam from said first single blazed binary diffractive optical element into a first double diffracted light beam, and a fourth single blazed binary diffractive optical element having a multilevel surface relief phase grating structure upon an optical substrate, said multilevel surface relief phase grating structure having individual blazed diffraction gratings for diffracting said double diffracted light beam from said second single blazed binary diffractive optical element into a second double diffracted light beam, wherein said first double diffracted light beam and said second double diffracted light beam are a lesser distance apart than said first light beam and said second light beam.

8. The beam separation control apparatus for separating a first light beam and a second light beam of claim 7 wherein said individual blazed diffraction gratings of said first single blazed binary diffractive optical element have opposite blazing with respect to said individual blazed diffraction gratings of said second single blazed binary diffractive optical element.

9. The beam separation control apparatus for separating a first light beam and a second light beam of claim 7 wherein said individual blazed diffraction gratings of said third single blazed binary diffractive optical element have inverse blazing with respect to said individual blazed diffraction gratings of said first single blazed binary diffractive optical element.

10. The beam separation control apparatus for separating a first light beam and a second light beam of claim 7 wherein said individual blazed diffraction gratings of said fourth single blazed binary diffractive optical element have inverse blazing with respect to said individual blazed diffraction gratings of said second single blazed binary diffractive optical element.

11. The beam separation control apparatus for separating a first light beam and a second light beam of claim 7 wherein said first single blazed binary diffractive optical element and said second single blazed binary diffractive optical element have the same substrate.

12. The beam separation control apparatus for separating a first light beam and a second light beam of claim 7 wherein said third single blazed binary diffractive optical element and said fourth single blazed binary diffractive optical element have the same substrate.

13. A beam separation control apparatus for separating a first light beam and a second light beam comprising a first single blazed binary diffractive optical element having a multilevel surface relief phase grating structure upon an optical substrate, said multilevel surface relief phase grating structure having individual blazed diffraction gratings for diffracting said first light beam into a first diffracted light beam, a second single blazed binary diffractive optical element having a multilevel surface relief phase grating structure upon an optical substrate, said multilevel surface relief phase grating structure having individual blazed diffraction gratings for diffracting said second light beam into a second diffracted light beam, a third single blazed binary diffractive optical element having a multilevel surface relief phase grating structure upon an optical substrate, said multilevel surface relief phase grating structure having individual blazed diffraction gratings for diffracting said first diffracted light beam from said first single blazed binary diffractive optical element into a first double diffracted light beam, a fourth single blazed binary diffractive optical element having a multilevel surface relief phase grating structure upon an optical substrate, said multilevel surface relief phase grating structure having individual blazed diffraction gratings for diffracting said second diffracted light beam from said second single blazed binary diffractive optical element into a second double diffracted light beam, wherein said first double diffracted light beam and said second double diffracted light beam are a greater distance apart than said first light beam and said second light beam, a fifth single blazed binary diffractive optical element having a multilevel surface relief phase grating structure upon an optical substrate, said multilevel surface relief phase grating structure having individual blazed diffraction gratings for diffracting said first double diffracted beam from said third single blazed binary diffractive optical element into a first thrice diffracted light beam, a sixth single blazed binary diffractive optical element having a multilevel surface relief phase grating structure upon an optical substrate, said multilevel surface relief phase grating structure having individual blazed diffraction gratings for diffracting said second double diffracted light beam from said fourth single blazed binary diffractive optical element into a second thrice diffracted light beam, a seventh single blazed binary diffractive optical element having a multilevel surface relief phase grating structure upon an optical substrate, said multilevel surface relief phase grating structure having individual blazed diffraction gratings for diffracting said first thrice diffracted light beam from said fifth single blazed binary diffractive optical element into a first quadruple diffracted light beam, and a eighth single blazed binary diffractive optical element having a multilevel surface relief phase grating structure upon an optical substrate, said multilevel surface relief phase grating structure having individual blazed diffraction gratings for diffracting said second thrice diffracted light beam from said sixth single blazed binary diffractive optical element into a second quadruple diffracted light beam, wherein said first quadruple diffracted light beam and said second quadruple diffracted light beam are a lesser distance apart than said said first double diffracted light beam and said second double diffracted light beam.

14. The beam separation control apparatus for separating a first light beam and a second light beam of claim 13 further comprising optical means for modulating said first double diffracted light beam.

15. The beam separation control apparatus for separating a first light beam and a second light beam of claim 13 further comprising optical means for modulating said second double diffracted light beam.

16. A beam separation control apparatus for separating a first light beam and a second light beam of claim 13 further comprising first optical means for modulating said first double diffracted light beam and second optical means for modulating said second double diffracted light beam.

17. The beam separation control apparatus for separating a first light beam and a second light beam of claim 13 wherein said individual blazed diffraction gratings of said first single blazed binary diffractive optical element have opposite blazing with respect to said individual blazed diffraction gratings of said second single blazed binary diffractive optical element.

18. The beam separation control apparatus for separating a first light beam and a second light beam of claim 13 wherein said individual blazed diffraction gratings of said third single blazed binary diffractive optical element have inverse blazing with respect to said individual blazed diffraction gratings of said first single blazed binary diffractive optical element.

19. The beam separation control apparatus for separating a first light beam and a second light beam of claim 13 wherein said individual blazed diffraction gratings of said fourth single blazed binary diffractive optical element have inverse blazing with respect to said individual blazed diffraction gratings of said second single blazed binary diffractive optical element.

20. The beam separation control apparatus for separating a first light beam and a second light beam of claim 13 wherein said individual blazed diffraction gratings of said seventh single blazed binary diffractive optical element have opposite blazing with respect to said individual blazed diffraction gratings of said eighth single blazed binary diffractive optical element.

21. The beam separation control apparatus for separating a first light beam and a second light beam of claim 13 wherein said individual blazed diffraction gratings of said fifth single blazed binary diffractive optical element have inverse blazing with respect to said individual blazed diffraction gratings of said seventh single blazed binary diffractive optical element.

22. The beam separation control apparatus for separating a first light beam and a second light beam of claim 13 wherein said individual blazed diffraction gratings of said sixth single blazed binary diffractive optical element have inverse blazing with respect to said individual blazed diffraction gratings of said eighth single blazed binary diffractive optical element.

23. The beam separation control apparatus for separating a first light beam and a second light beam of claim 13 wherein said first single blazed binary diffractive optical element and said second single blazed binary diffractive optical element have the same substrate, said third single blazed binary diffractive optical element and said fourth single blazed binary diffractive optical element have the same substrate, said fifth single blazed binary diffractive optical element and said sixth single blazed binary diffractive optical element have the same substrate, and said seventh single blazed binary diffractive optical element and said eighth single blazed binary diffractive optical element have the same substrate.

24. A binary diffractive optical element beam splitter apparatus for splitting a first light beam comprising a first single blazed binary diffractive optical element having a multilevel surface relief phase grating structure upon an optical substrate, said multilevel surface relief phase grating structure having individual blazed diffraction gratings for diffracting said first light beam into a first diffracted light beam, a second single blazed binary diffractive optical element having a multilevel surface relief phase grating structure upon an optical substrate, said multilevel surface relief phase grating structure having individual blazed diffraction gratings for diffracting said first light beam into a second diffracted light beam, wherein said first single blazed binary diffractive optical element and said second single blazed binary diffractive optical element are adjacent and said individual blazed diffraction gratings of said first single blazed binary diffractive optical element have opposite blazing with respect to said individual blazed diffraction gratings of said second single blazed binary diffractive optical element, a third single blazed binary diffractive optical element having a multilevel surface relief phase grating structure upon an optical substrate, said multilevel surface relief phase grating structure having individual blazed diffraction gratings for diffracting said first diffracted light beam from said first single blazed binary diffractive optical element into a first double diffracted light beam, and a fourth single blazed binary diffractive optical element having a multilevel surface relief phase grating structure upon an optical substrate, said multilevel surface relief phase grating structure having individual blazed diffraction gratings for diffracting said second diffracted light beam from said second single blazed binary diffractive optical element into a second double diffracted light beam.

25. The binary diffractive optical element beam splitter apparatus for splitting a first light beam of claim 24 wherein said individual blazed diffraction gratings of said third single blazed binary diffractive optical element have inverse blazing with respect to said individual blazed diffraction gratings of said first single blazed binary diffractive optical element.

26. The binary diffractive optical element beam splitter apparatus for splitting a first light beam of claim 24 wherein said individual blazed diffraction gratings of said fourth single blazed binary diffractive optical element have inverse blazing with respect to said individual blazed diffraction gratings of said second single blazed binary diffractive optical element.

27. The binary diffractive optical element beam splitter apparatus for splitting a first light beam of claim 24 wherein wherein said first single blazed binary diffractive optical element and said second single blazed binary diffractive optical element have the same substrate.

28. The binary diffractive optical element beam splitter apparatus for splitting a first light beam of claim 24 wherein third single blazed binary diffractive optical element and said fourth single blazed binary diffractive optical element have the same substrate.

29. A binary diffractive optical element beam combiner apparatus for combining a first light beam and a second light beam comprising a first single blazed binary diffractive optical element having a multilevel surface relief phase grating structure upon an optical substrate, said multilevel surface relief phase grating structure having individual blazed diffraction gratings for diffracting said first light beam into a first diffracted light beam, a second single blazed binary diffractive optical element having a multilevel surface relief phase grating structure upon an optical substrate, said multilevel surface relief phase grating structure having individual blazed diffraction gratings for diffracting said second light beam into a second diffracted light beam, a third single blazed binary diffractive optical element having a multilevel surface relief phase grating structure upon an optical substrate, said multilevel surface relief phase grating structure having individual blazed diffraction gratings for diffracting said first diffracted light beam from said first single blazed binary diffractive optical element into a first double diffracted light beam, and a fourth single blazed binary diffractive optical element having a multilevel surface relief phase grating structure upon an optical substrate, said multilevel surface relief phase grating structure having individual blazed diffraction gratings for diffracting said second diffracted light beam from said second single blazed binary diffractive optical element into said first double diffracted light beam, wherein said third single blazed binary diffractive optical element and said fourth single blazed binary diffractive optical element are adjacent and said individual blazed diffraction gratings of said third single blazed binary diffractive optical element have opposite blazing with respect to said individual blazed diffraction gratings of said fourth single blazed binary diffractive optical element.

30. The binary diffractive optical element beam combiner apparatus for combining a first light beam and a second light beam of claim 29 wherein said individual blazed diffraction gratings of said third single blazed binary diffractive optical element have inverse blazing with respect to said individual blazed diffraction gratings of said first single blazed binary diffractive optical element.

31. The binary diffractive optical element beam combiner apparatus for combining a first light beam and a second light beam of claim 29 wherein said individual blazed diffraction gratings of said fourth single blazed binary diffractive optical element have inverse blazing with respect to said individual blazed diffraction gratings of said second single blazed binary diffractive optical element.

32. The binary diffractive optical element beam combiner apparatus for combining a first light beam and a second light beam of claim 29 wherein said first single blazed binary diffractive optical element and said second single blazed binary diffractive optical element have the same substrate.

33. The binary diffractive optical element beam combiner apparatus for combining a first light beam and a second light beam of claim 29 wherein third single blazed binary diffractive optical element and said fourth single blazed binary diffractive optical element have the same substrate.

34. A beam splitting and beam combining apparatus comprising a first single blazed binary diffractive optical element having a multilevel surface relief phase grating structure upon an optical substrate, said multilevel surface relief phase grating structure having individual blazed diffraction gratings for diffracting a portion of an incident light beam into a first diffracted light beam, a second single blazed binary diffractive optical element having a multilevel surface relief phase grating structure upon an optical substrate, said multilevel surface relief phase grating structure having individual blazed diffraction gratings for a portion of said incident light beam into a second diffracted light beam, wherein said first single blazed binary diffractive optical element and said second single blazed binary diffractive optical element are adjacent and said individual blazed diffraction gratings of said first single blazed binary diffractive optical element have opposite blazing with respect to said individual blazed diffraction gratings of said second single blazed binary diffractive optical element, a third single blazed binary diffractive optical element having a multilevel surface relief phase grating structure upon an optical substrate, said multilevel surface relief phase grating structure having individual blazed diffraction gratings for diffracting said first diffracted light beam from said first single blazed binary diffractive optical element into a first double diffracted light beam, a fourth single blazed binary diffractive optical element having a multilevel surface relief phase grating structure upon an optical substrate, said multilevel surface relief phase grating structure having individual blazed diffraction gratings for diffracting said second diffracted light beam from said second single blazed binary diffractive optical element into a second double diffracted light beam, a fifth single blazed binary diffractive optical element having a multilevel surface relief phase grating structure upon an optical substrate, said multilevel surface relief phase grating structure having individual blazed diffraction gratings for diffracting said first double diffracted beam from said third single blazed binary diffractive optical element into a first thrice diffracted light beam, a sixth single blazed binary diffractive optical element having a multilevel surface relief phase grating structure upon an optical substrate, said multilevel surface relief phase grating structure having individual blazed diffraction gratings for diffracting said second double diffracted light beam from said fourth single blazed binary diffractive optical element into a second thrice diffracted light beam.

a seventh single blazed binary diffractive optical element having a multilevel surface relief phase grating structure upon an optical substrate, said multilevel surface relief phase grating structure having individual blazed diffraction gratings for diffracting said first thrice diffracted light beam from said fifth single blazed binary diffractive optical element into a first quadruple diffracted light beam, and a eighth single blazed binary diffractive optical element having a multilevel surface relief phase grating structure upon an optical substrate, said multilevel surface relief phase grating structure having individual blazed diffraction gratings for diffracting said second thrice diffracted light beam from said sixth single blazed binary diffractive optical element into said first quadruple diffracted light beam, wherein said seventh single blazed binary diffractive optical element and said eighth single blazed binary diffractive optical element are adjacent and said individual blazed diffraction gratings of said seventh single blazed binary diffractive optical element have opposite blazing with respect to said individual blazed diffraction gratings of said eighth single blazed binary diffractive optical element.

35. The beam splitting and beam combining apparatus of claim 34 further comprising optical means for modulating said first double diffracted light beam.

36. The beam splitting and beam combining apparatus of claim 34 further comprising optical means for modulating said second double diffracted light beam.

37. The beam splitting and beam combining apparatus of claim 34 further comprising first optical means for modulating said first double diffracted light beam and second optical means for modulating said second double diffracted light beam.

38. The beam splitting and beam combining apparatus of claim 34 wherein said individual blazed diffraction gratings of said third single blazed binary diffractive optical element have inverse blazing with respect to said individual blazed diffraction gratings of said first single blazed binary diffractive optical element.

39. The beam splitting and beam combining apparatus of claim 34 wherein said individual blazed diffraction gratings of said fourth single blazed binary diffractive optical element have inverse blazing with respect to said individual blazed diffraction gratings of said second single blazed binary diffractive optical element.

40. The beam splitting and beam combining apparatus of claim 34 wherein said individual blazed diffraction gratings of said fifth single blazed binary diffractive optical element have inverse blazing with respect to said individual blazed diffraction gratings of said seventh single blazed binary diffractive optical element.

41. The beam splitting and beam combining apparatus of claim 34 wherein said individual blazed diffraction gratings of said sixth single blazed binary diffractive optical element have inverse blazing with respect to said individual blazed diffraction gratings of said eighth single blazed binary diffractive optical element.

42. The beam splitting and beam combining apparatus of claim 34 wherein said first single blazed binary diffractive optical element and said second single blazed binary diffractive optical element have the same substrate, said third single blazed binary diffractive optical element and said fourth single blazed binary diffractive optical element have the same substrate, said fifth single blazed binary diffractive optical element and said sixth single blazed binary diffractive optical element have the same substrate, and said seventh single blazed binary diffractive optical element and said eighth single blazed binary diffractive optical element have the same substrate.

43. A beam splitting and beam separation control apparatus comprising a first single blazed binary diffractive optical element having a multilevel surface relief phase grating structure upon an optical substrate, said multilevel surface relief phase grating structure having individual blazed diffraction gratings for diffracting a portion of an incident light beam into a first diffracted light beam, a second single blazed binary diffractive optical element having a multilevel surface relief phase grating structure upon an optical substrate, said multilevel surface relief phase grating structure having individual blazed diffraction gratings for a portion of said incident light beam into a second diffracted light beam, wherein said first single blazed binary diffractive optical element and said second single blazed binary diffractive optical element are adjacent and said individual blazed diffraction gratings of said first single blazed binary diffractive optical element have opposite blazing with respect to said individual blazed diffraction gratings of said second single blazed binary diffractive optical element, a third single blazed binary diffractive optical element having a multilevel surface relief phase grating structure upon an optical substrate, said multilevel surface relief phase grating structure having individual blazed diffraction gratings for diffracting said first diffracted light beam from said first single blazed binary diffractive optical element into a first double diffracted light beam, a fourth single blazed binary diffractive optical element having a multilevel surface relief phase grating structure upon an optical substrate, said multilevel surface relief phase grating structure having individual blazed diffraction gratings for diffracting said second diffracted light beam from said second single blazed binary diffractive optical element into a second double diffracted light beam, a fifth single blazed binary diffractive optical element having a multilevel surface relief phase grating structure upon an optical substrate, said multilevel surface relief phase grating structure having individual blazed diffraction gratings for diffracting said first double diffracted beam from said third single blazed binary diffractive optical element into a first thrice diffracted light beam, a sixth single blazed binary diffractive optical element having a multilevel surface relief phase grating structure upon an optical substrate, said multilevel surface relief phase grating structure having individual blazed diffraction gratings for diffracting said second double diffracted light beam from said fourth single blazed binary diffractive optical element into a second thrice diffracted light beam.

a seventh single blazed binary diffractive optical element having a multilevel surface relief phase grating structure upon an optical substrate, said multilevel surface relief phase grating structure having individual blazed diffraction gratings for diffracting said first thrice diffracted light beam from said fifth single blazed binary diffractive optical element into a first quadruple diffracted light beam, and a eighth single blazed binary diffractive optical element having a multilevel surface relief phase grating structure upon an optical substrate, said multilevel surface relief phase grating structure having individual blazed diffraction gratings for diffracting said second thrice diffracted light beam from said sixth single blazed binary diffractive optical element into a second quadruple diffracted light beam, wherein said first quadruple diffracted light beam and said second quadruple diffracted light beam are a lesser distance apart than said said first double diffracted light beam and said second double diffracted light beam.

44. The beam splitting and beam separation control apparatus of claim 43 further comprising optical means for modulating said first double diffracted light beam.

45. The beam splitting and beam separation control apparatus of claim 43 further comprising optical means for modulating said second double diffracted light beam.

46. The beam splitting and beam separation control apparatus of claim 43 further comprising first optical means for modulating said first double diffracted light beam and second optical means for modulating said second double diffracted light beam.

47. The beam splitting and beam separation control apparatus of claim 43 wherein said individual blazed diffraction gratings of said third single blazed binary diffractive optical element have inverse blazing with respect to said individual blazed diffraction gratings of said first single blazed binary diffractive optical element.

48. The beam splitting and beam separation control apparatus of claim 43 wherein said individual blazed diffraction gratings of said fourth single blazed binary diffractive optical element have inverse blazing with respect to said individual blazed diffraction gratings of said second single blazed binary diffractive optical element.

49. The beam splitting and beam separation control apparatus of claim 43 wherein said individual blazed diffraction gratings of said fifth single blazed binary diffractive optical element have inverse blazing with respect to said individual blazed diffraction gratings of said seventh single blazed binary diffractive optical element.

50. The beam splitting and beam separation control apparatus of claim 43 wherein said individual blazed diffraction gratings of said sixth single blazed binary diffractive optical element have inverse blazing with respect to said individual blazed diffraction gratings of said eighth single blazed binary diffractive optical element.

51. The beam splitting and beam separation control apparatus of claim 43 wherein said first single blazed binary diffractive optical element and said second single blazed binary diffractive optical element have the same substrate, said third single blazed binary diffractive optical element and said fourth single blazed binary diffractive optical element have the same substrate, said fifth single blazed binary diffractive optical element and said sixth single blazed binary diffractive optical element have the same substrate, and said seventh single blazed binary diffractive optical element and said eighth single blazed binary diffractive optical element have the same substrate.

52. A beam separation control and beam combining apparatus comprising a first single blazed binary diffractive optical element having a multilevel surface relief phase grating structure upon an optical substrate, said multilevel surface relief phase grating structure having individual blazed diffraction gratings for diffracting a first light beam into a first diffracted light beam, a second single blazed binary diffractive optical element having a multilevel surface relief phase grating structure upon an optical substrate, said multilevel surface relief phase grating structure having individual blazed diffraction gratings for diffracting a second light beam into a second diffracted light beam, a third single blazed binary diffractive optical element having a multilevel surface relief phase grating structure upon an optical substrate, said multilevel surface relief phase grating structure having individual blazed diffraction gratings for diffracting said first diffracted light beam from said first single blazed binary diffractive optical element into a first double diffracted light beam, a fourth single blazed binary diffractive optical element having a multilevel surface relief phase grating structure upon an optical substrate, said multilevel surface relief phase grating structure having individual blazed diffraction gratings for diffracting said second diffracted light beam from said second single blazed binary diffractive optical element into a second double diffracted light beam, wherein said first double diffracted light beam and said second double diffracted light beam are a greater distance apart than said first light beam and said second light beam, a fifth single blazed binary diffractive optical element having a multilevel surface relief phase grating structure upon an optical substrate, said multilevel surface relief phase grating structure having individual blazed diffraction gratings for diffracting said first double diffracted beam from said third single blazed binary diffractive optical element into a first thrice diffracted light beam, a sixth single blazed binary diffractive optical element having a multilevel surface relief phase grating structure upon an optical substrate, said multilevel surface relief phase grating structure having individual blazed diffraction gratings for diffracting said second double diffracted light beam from said fourth single blazed binary diffractive optical element into a second thrice diffracted light beam, a seventh single blazed binary diffractive optical element having a multilevel surface relief phase grating structure upon an optical substrate, said multilevel surface relief phase grating structure having individual blazed diffraction gratings for diffracting said first thrice diffracted light beam from said fifth single blazed binary diffractive optical element into a first quadruple diffracted light beam, and a eighth single blazed binary diffractive optical element having a multilevel surface relief phase grating structure upon an optical substrate, said multilevel surface relief phase grating structure having individual blazed diffraction gratings for diffracting said second thrice diffracted light beam from said sixth single blazed binary diffractive optical element into said first quadruple diffracted light beam, wherein said seventh single blazed binary diffractive optical element and said eighth single blazed binary diffractive optical element are adjacent and said individual blazed diffraction gratings of said seventh single blazed binary diffractive optical element have opposite blazing with respect to said individual blazed diffraction gratings of said eighth single blazed binary diffractive optical element.

53. The beam separation control and beam combining apparatus of claim 52 further comprising optical means for modulating said first double diffracted light beam.

54. The beam separation control and beam combining apparatus of claim 52 further comprising optical means for modulating said second double diffracted light beam.

55. The beam separation control and beam combining apparatus of claim 52 further comprising first optical means for modulating said first double diffracted light beam and second optical means for modulating said second double diffracted light beam.

56. The beam separation control and beam combining apparatus of claim 52 wherein said individual blazed diffraction gratings of said third single blazed binary diffractive optical element have inverse blazing with respect to said individual blazed diffraction gratings of said first single blazed binary diffractive optical element.

57. The beam separation control and beam combining apparatus of claim 52 wherein said individual blazed diffraction gratings of said fourth single blazed binary diffractive optical element have inverse blazing with respect to said individual blazed diffraction gratings of said second single blazed binary diffractive optical element.

58. The beam separation control and beam combining apparatus of claim 52 wherein said individual blazed diffraction gratings of said fifth single blazed binary diffractive optical element have inverse blazing with respect to said individual blazed diffraction gratings of said seventh single blazed binary diffractive optical element.

59. The beam separation control and beam combining apparatus of claim 52 wherein said individual blazed diffraction gratings of said sixth single blazed binary diffractive optical element have inverse blazing with respect to said individual blazed diffraction gratings of said eighth single blazed binary diffractive optical element.

60. The beam separation control and beam combining apparatus of claim 52 wherein said first single blazed binary diffractive optical element and said second single blazed binary diffractive optical element have the same substrate, said third single blazed binary diffractive optical element and said fourth single blazed binary diffractive optical element have the same substrate, said fifth single blazed binary diffractive optical element and said sixth single blazed binary diffractive optical element have the same substrate, and said seventh single blazed binary diffractive optical element and said eighth single blazed binary diffractive optical element have the same substrate.

* * * * *